April 22, 1941.　　　F. W. YOUNG　　　2,238,962
FILTER
Filed Sept. 30, 1938　　　2 Sheets-Sheet 2

INVENTOR
FRANK W. YOUNG
BY
Orton and Griswold
ATTORNEYS

Patented Apr. 22, 1941

2,238,962

UNITED STATES PATENT OFFICE 2,238,962

FILTER

Frank W. Young, Upper Montclair, N. J.

Application September 30, 1938, Serial No. 232,508

4 Claims. (Cl. 210—201)

This invention relates to continuous filters of the kind in which a partially submerged filter drum rotates in a tank of slurry and filtrate is drawn through a filtering surface to build up a deposit of solid particles as a cake thereon.

In some situations, difficulty is encountered in removing the filtered material from the surface of the filter drum, and it has heretofore been proposed to blow air or other gaseous medium outwardly through filtrate passages in the filter drum, at a predetermined area of the surface thereof, to separate the cake from the filtering medium for ready removal.

One object of the present invention is a practical instrumentality for effecting this releasing of the cake from the filtering medium.

It is also an object of this invention to facilitate the removal of filtrate from the interior of the drum. To this end the heads or ends of the filter drum are formed of large hollow trunnions to allow unrestricted and free and rapid evacuation of the filtrate from the interior of the drum. The same enlarged passages leading to the interior of the drum conveniently receive the conduits conducting relatively weak wash water from the drum interior to prevent dilution of the filtrate.

It is another object of the invention to seal the joint between the interior of the drum surface and the shoe by which air or other gaseous medium is delivered outwardly through the filtering passages.

Another object of the invention is to provide a suitable support for the devices delivering air or other gaseous medium against the interior of the drum surface.

The invention also seeks a filter which is practical from the standpoint of ease and cheapness of manufacture.

Figure 1:
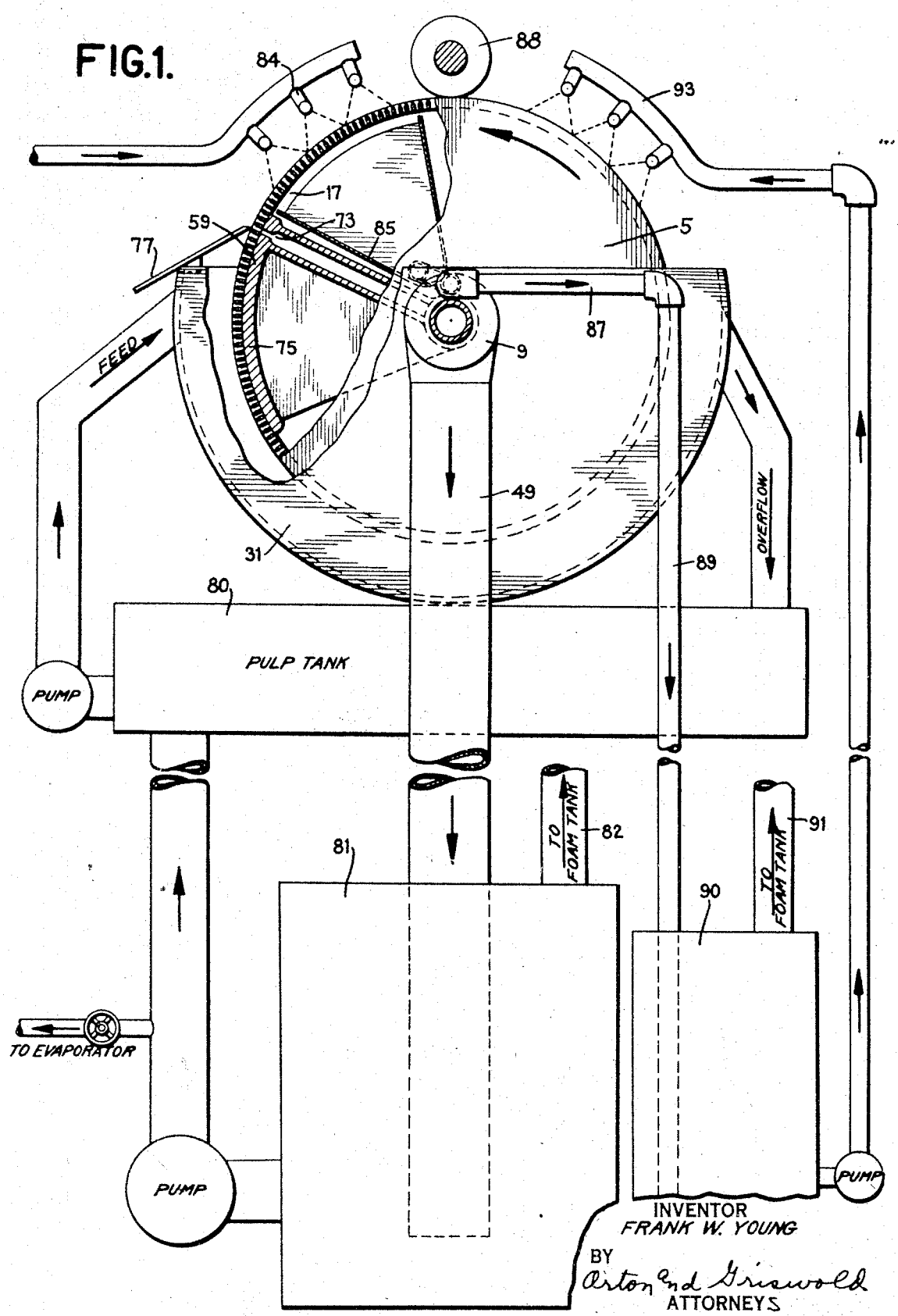
Figure 2:
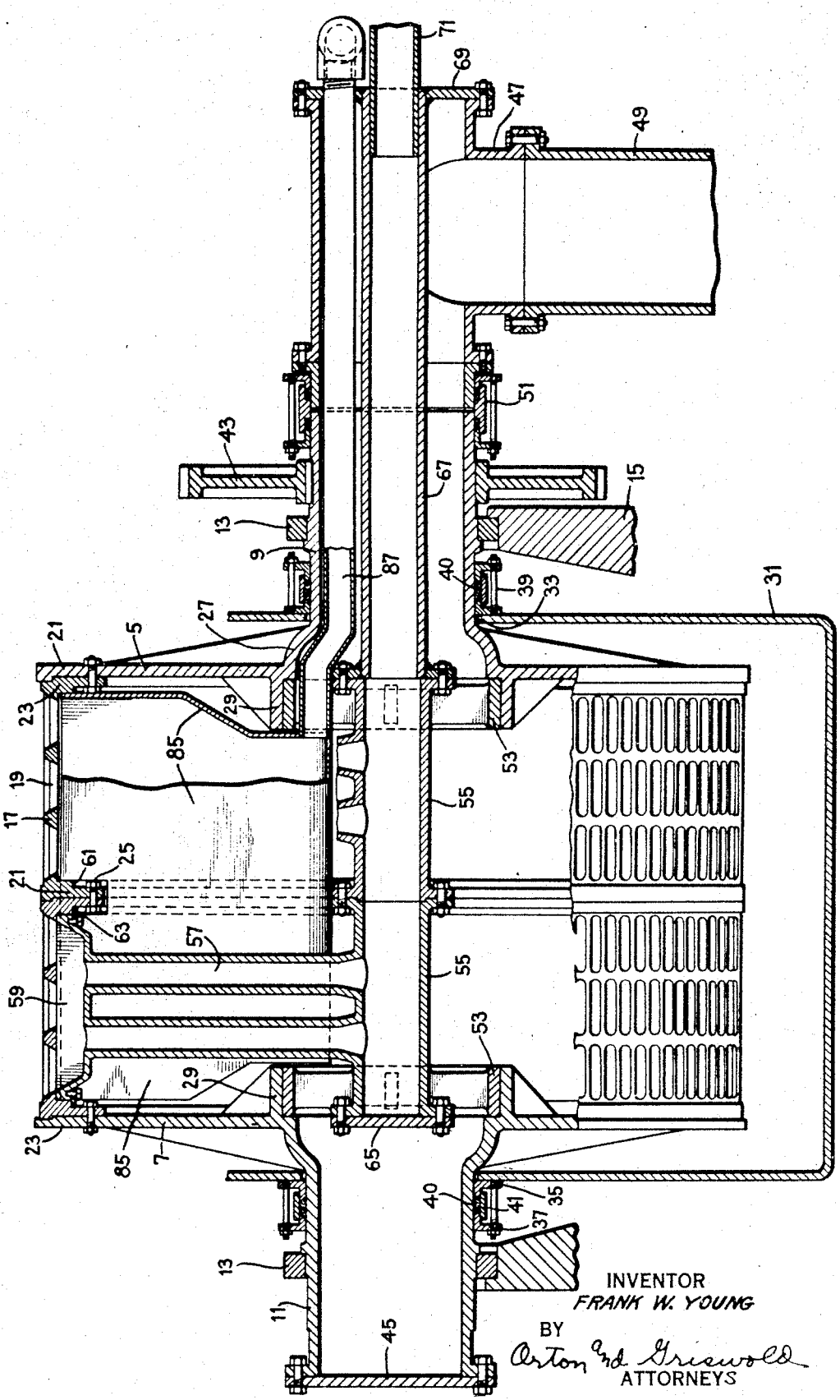

These and other objects of the invention and the means for their attainment will be more apparent from the following detailed description, taken in connection with the accompanying drawings illustrating various embodiments by which the invention may be realized and in which:

Figure 1 is a view in side elevation showing the filter of this invention, parts being broken away to show details of construction; and Figure 2 is a longitudinal sectional view taken on the vertical diameter of the filter viewed in Figure 1 and showing permissible accessories.

The continuous filter of this invention is shown in Figure 2 as comprising a filter drum comprising two disc-like ends 5, 7 formed with outwardly or oppositely extending trunnions 9, 11 received and turning in bearings 13 suitably supported from a base 15, one on each side of the drum. The surface of the drum is made up of a plurality of sector shaped members 17 apertured as at 19 and provided with interlocking portions 21, 23 whereby adjoining sections may be secured together as by the bolts 25 and whereby the sections are secured to the adjacent sides of the filter drum which have interlocking sections 21 and 23 for that purpose, making this drum cylinder easily adaptable to cast metal construction. Also the multiple sections allow various width drums of one diameter to be constructed from one shell pattern. Proximate the drum sides the trunnions are enlarged, as at 27, for the passage of pipe line 87. Extending inwardly from each side wall 5, 7 is a cylindrical support 29 for an air delivery device hereinafter to be described.

The filter drum rotates in a filter tank 31 through apertures 33 in the respective sides of which the trunnions 9, 11, pass. The apertures 33 are suitably sealed by a conventional stuffing box, one member 35 of which is carried by the tank 31 and the other member 37 of which encircles the trunnion and is adjustably connected thereto as by bolt 39, the packing being indicated at 40 and being held in place by an annular strap 41.

The filter may be rotated in any convenient manner. As shown, a gear 43 is fixed to one of the trunnions. This gear may be driven by any suitable train of gears to obtain the speed of rotation desired of the filter.

The trunnion 11 at the left hand side of Figure 2 is closed by a plate or cap 45. The trunnion 9 on the right side of the filter drum is in communicating relation with a T 47 fixed in position and connected with the water leg 49, the joint between the trunnion and the T being sealed by a conventional stuffing box 51. Disposed within the cylindrical supports 29, aforesaid, are annular bearings 53 carried on the remote ends of tubular sections 55 forming delivery means by which a gaseous medium may be delivered to the inner surface of the drum at predetermined points to effect cake discharge. As shown, each tubular member 55 carries one or more branch conduits 57 opening into the tubular member 55 on the one hand and at the outer end into a shoe 59 adapted to have sealing contact with the inner surface of the drum. The interior of the drum proximate the box, offset as at 61, is adapted to receive sealing means 63 carried by the shoe 59 to seal the joint between the respective parts. One end of the tubular member 55 is sealed as by a plate or cap 65. The other end of the tubular member 55 is in communicating connection with a duct 67 which extends through the trunnion 9 and through the T 47 and through a cap 69 closing the end of the T, the duct 67 being open to receive a pipe 71 from a source of gaseous medium under pressure.

The shoe 59 is provided with an outlet 73, Figure 1, adapted to register with and be coextensive with the apertures 19 in a single radial plane. An arcuate sealing member 75 extends downwardly from the shoe 59 to seal the drum openings between the point of cake take-off as by a doctor blade 77 and the slurry level.

In Figure 1, the filter is in end elevation, partly in section, with the filter drum mounted in the filter tank and a pipe diagram to show diagrammatically the arrangement for an operation in pulp washing such as the washing of brown stock in the manufacture of kraft pulp. The solution of pulp is pumped from the pulp tank or supply 80 into the filter tank 31. The liquid is forced through the filter medium (not shown) on the surface of the filter drum and a filter cake of pulp fibers is built up on the outside and the fiber free liquor flows through into the drum interior. From the filter drum, the liquor is carried through the trunnion to the barometric drop leg 49 into a seal tank 81. From the seal tank 81, a large portion of this clear liquid is pumped back to the pulp tank 80 for dilution of the pulp while a small portion is sent to the evaporators. In this operation, the liquid has a tendency to foam badly. Therefore, a connection 82 is indicated from the top of the seal tank to a foam tank, not shown. Wash water for washing the pulp is sprayed on the filter cake usually before the point of discharge, as at 84. The wash water passes through the pulp sheet, washing the pulp and picking up the chemicals from the pulp and is collected in a pan 85 located in the interior of the filter drum and is carried out through a pipe line 87 down a barometric leg 89 into another seal tank 90. This tank is also provided with a connection 91 to a foam tank. The liquid from this seal tank 90 is pumped up to a set of spray nozzles 93 located so as to spray liquid on the pulp sheet usually after it emerges from the filter tank. This wash liquor, after passing through the pulp sheet, enters the filter drum and mixes with the filtrate. In order to take out as much strong liquor as possible before entering the weak liquor pan 85, a press roll 88 is located approximately at the vertical center line of the filter drum to compress the pulp sheet and squeeze out the surplus liquor.

Various modifications will occur to those skilled in the art in the composition, configuration and disposition of the component elements going to make up the invention as a whole as well as in the use of selected elements in given situations and no limitation is intended by the phraseology of the foregoing description or illustrations in the accompanying drawings except as indicated in the appended claims.

What is claimed is:

1. A continuous filter comprising a filter drum, filtering medium covering the drum periphery, hollow trunnions carried thereby and in communication with the drum interior, bearings in which said trunnions rotate, means to create sub-atmospheric pressure in a trunnion and thereby in the drum interior to evacuate liquid and gas from the drum interior, and means to deliver a gaseous medium to the interior surface of the drum comprising a plurality of interchangeable tubular members having connecting means at each end, at least one conduit extending therefrom and a shoe in communicating connection with the free end of the conduit means formed with a passage in register with the conduit, said shoe being of an arcuate length to extend downwardly below the trunnion.

2. A continuous filter comprising a filter drum, filtering medium covering the drum periphery, hollow trunnions carried thereby and in communication with the drum interior, bearings in which said trunnions rotate, means to create sub-atmospheric pressure in a trunnion and thereby in the drum interior to evacuate liquid and gas from the drum interior, and means to deliver a gaseous medium to the interior surface of the drum comprising a plurality of integral interchangeable tubular members having connecting means at each end, at least one conduit integral therewith and extending therefrom and a shoe integral with and in communicating connection with the conduit.

3. A continuous filter comprising a filter drum, filtering medium covering the drum periphery, hollow trunnions carried thereby and in communicating connection with the drum interior, bearings in which said trunnions rotate, means to create sub-atmospheric pressure in a trunnion and thereby in the drum interior to evacuate liquid and gas from the drum interior, annular supporting flanges concentric with the trunnion and carried on the interior surface of the drum head, gaseous medium delivery means entering the drum through a hollow trunnion, cylindrical bearing means carried by the gaseous delivery means in spaced relation and turning in the annular supporting flange.

4. A continuous filter comprising a composite filter drum comprising disc-like side members and arcuate sections comprising the drum periphery and formed with filtrate passages and with side flanges, filtering medium covering the drum periphery, corresponding portions of the side flanges of said arcuate members and the drum sides being formed with coacting interlocking means, respectively, means to removably secure the said portions together and means to create sub-atmospheric pressure in the drum interior to evacuate liquid and gas from the drum interior.

FRANK W. YOUNG.